United States Patent [19]

Denis

[11] Patent Number: 4,779,653

[45] Date of Patent: Oct. 25, 1988

[54] TREE DELIMBER CONNECTOR

[75] Inventor: Laurent Denis, Ste. Rosalie, Canada

[73] Assignee: Equipements Denis Inc., St. Hyacinthe, Canada

[21] Appl. No.: 96,470

[22] Filed: Sep. 15, 1987

[30] Foreign Application Priority Data

Sep. 17, 1986 [CA] Canada .................................. 518410

[51] Int. Cl.[4] ............................................... B27L 1/00
[52] U.S. Cl. ..................................... 144/2 Z; 144/343
[58] Field of Search ....................... 144/2 Z, 3 D, 343

[56] References Cited

FOREIGN PATENT DOCUMENTS 965335  4/1975  Canada .............................. 144/2 Z Primary Examiner—W. Donald Bray
Attorney, Agent, or Firm—Charles E. Brown; Charles A. Brown

[57] ABSTRACT

An improved connector for use in tree delimbers in connecting a delimbing boom to a mobile carrier. The connector is constructed to allow the delimbing to be lowered relative to the tracked carrier, from a working position to a transport position. The connector also allows the delimbing boom to be pivoted relative to the carrier. The invention is also directed toward a tree delimber incorporating the improved connector.

2 Claims, 2 Drawing Sheets

TREE DELIMBER CONNECTOR

BACKGROUND OF THE INVENTION

1. Field of the Invention

This invention is directed toward an improved tree delimber.

The invention is also directed toward an improved connector for use in tree delimbers.

2. Description of the Prior Art

Tree delimbers are well known. A popular model employs a tree delimbing unit that is pivotally mounted in a raised position on a tracked carrier. The delimbing unit has a tubular frame through which a delimbing boom is movably mounted. The delimbing boom carries tree delimbing means at its front end. The tubular frame carries tree gripping means at its front end. While a tree is gripped by the tree gripping means on the frame, the boom is moved forwardly relative to the frame to have the delimbing means delimb the gripped tree. Fluid actuator means are pivotally connected between the carrier and the delimbing unit to help support the delimbing unit on a carrier and to tilt the delimbing unit relative to the carrier so that the delimbing means on the boom can be used to pick up trees off the ground to delimb them.

When the tree delimber is to be moved to a new work location, the delimbing unit is disconnected from the carrier to make moving easier. The disconnected delimbing unit can be placed on the carrier for transport in a position below its raised working position. Transport is now easier because the center of gravity of the delimber has been lowered; there is less interference with standing trees and brush while moving through the forest; and the delimber is now low enough that it can pass under bridges. However the dismantling of the delimbing unit for transport, and then its assembly at the new work site, is time consuming.

SUMMARY OF THE INVENTION

It is the purpose of the present invention to provide an improved delimber that mounts the delimbing unit on the carrier in a manner that the delimbing unit can be readily moved between a raised working position and a lowered travel position. Dismantling of the delimbing unit from the carrier for transportation purposes is thereby avoided greatly reducing down time of the delimber.

It is another purpose of the present invention to provide an improved connector for a delimber adapted to connect the delimbing unit to the carrier in a manner allowing the delimbing unit to be moved, relative to the carrier, between a raised working position and a lowered travel position.

In accordance with the present invention there is provided a first, fixed-length support member adapted to be pivotally connected between the carrier and the delimbing unit. Second variable length support members, in the form of hydraulic actuators, are adapted to be pivotally connected between the carrier and the first support member to pivot the first support member about its pivot connection at one end of the carrier thereby raising or lowering the delimbing unit that the first support member carries at its other end. Thus the second support members can raise the delimbing unit to a working position and maintain it there. When the time comes to change work sites, the second support members will lower the delimbing unit to a travel position.

The invention is particularly directed toward a tree delimber having a mobile carrier and a delimbing unit. First fixed-length support means are pivotally connected at one end to the carrier and at the other end to the delimbing unit. Second, variable-length support means are pivotally connected between the carrier and one of the first support means and the delimbing unit for helping to support the delimbing unit in a raised working position, and to move the delimbing unit between the raised working position and a lowered transport position.

The tree delimber includes third variable-length support means pivotally connected between the delimbing unit and one of the first support means and the carrier to pivot the delimbing unit about its pivot connection to the first support means.

Preferably, the second support means is pivotally connected to the first support means near its other end and the third support means is pivotally connected to the first support means near its one end.

The invention is also particularly directed to a delimber connector for use in connecting a delimbing unit to a carrier. The connector comprises a first fixed-length support member having one end adapted to be pivotally connected to the carrier and its other end adapted to be pivotally connected to the delimbing unit; at least one second variable-length support member pivotally connected at one end to the first support member near its other end and having its other end adapted to be pivotally connected to the carrier; and at least one third variable-length support member pivotally connected at one end to the first support member near its one end and having its other end adapted to be pivotally connected to the delimbing unit.

DESCRIPTION OF THE PREFERRED EMBODIMENT

Figure 1:
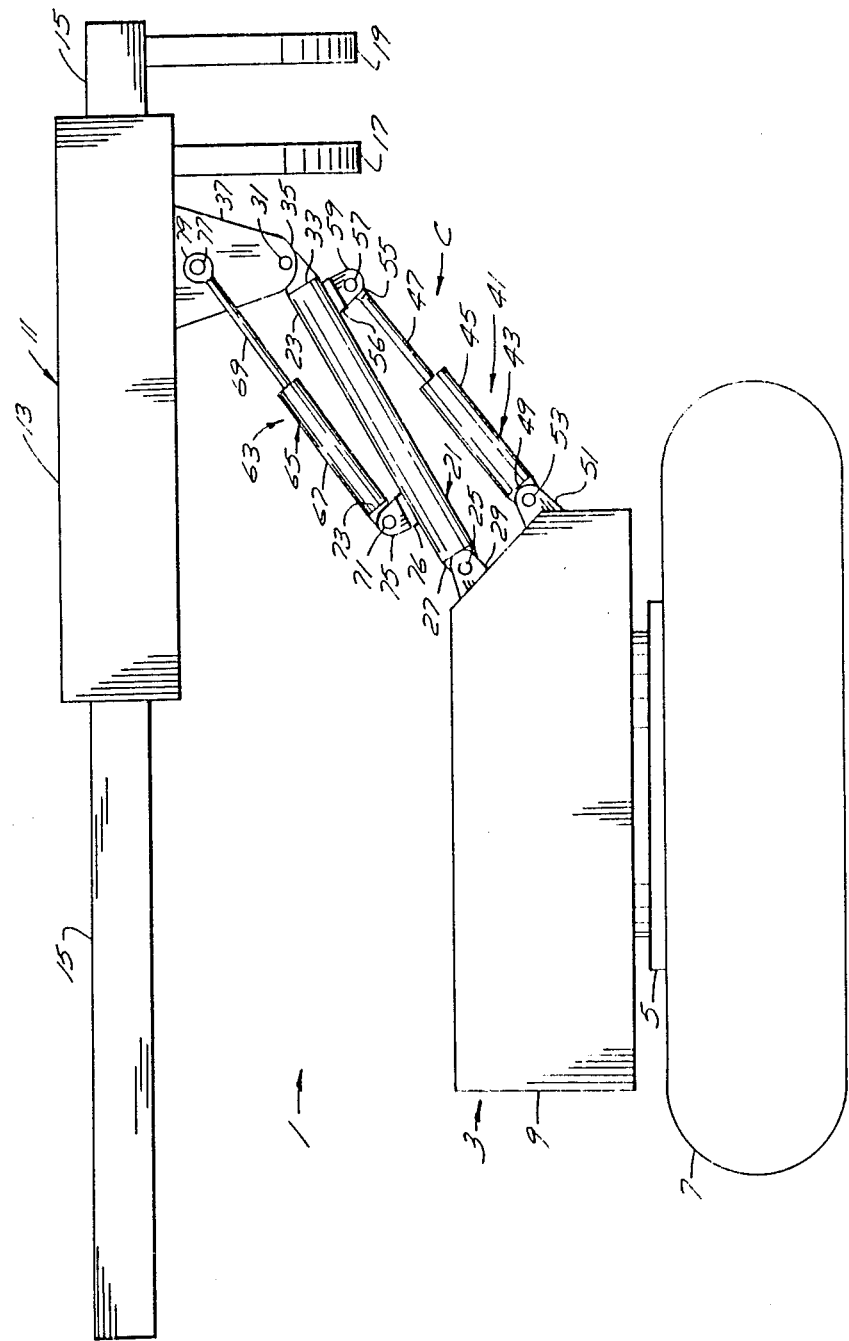
FIG. 1 is an elevation view of the delimber in its working position.
Figure 2:
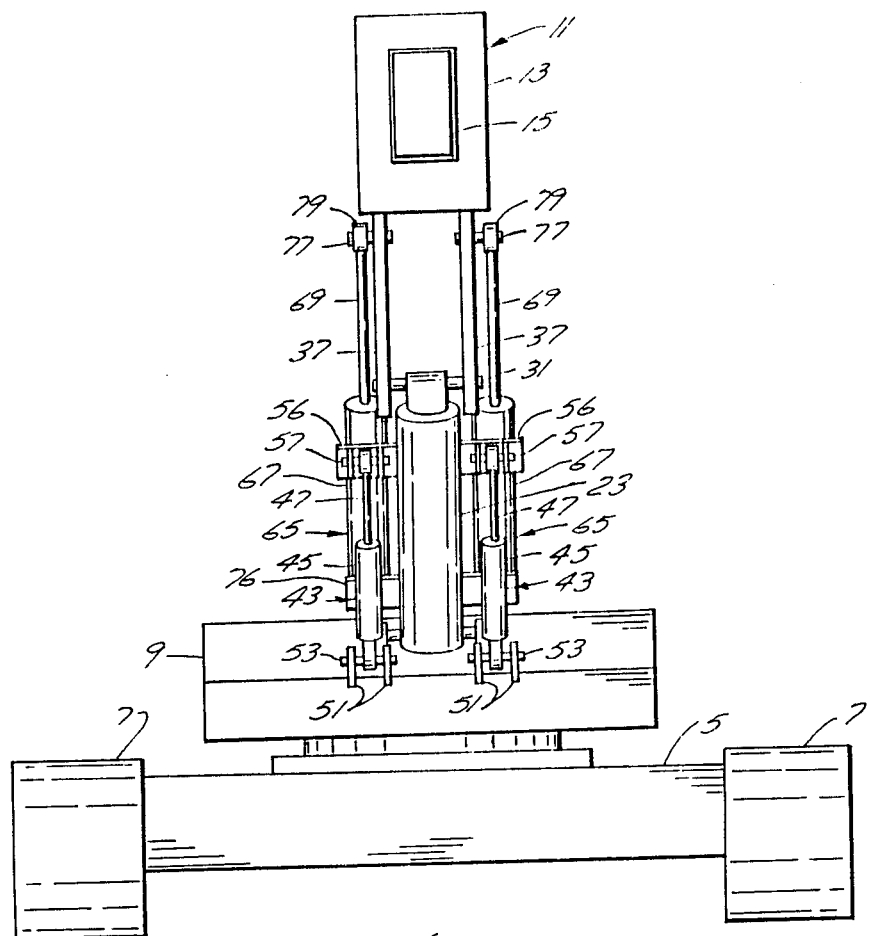
FIG. 2 is a front view of the delimber shown in FIG. 3.

The delimber 1 has a mobile carrier 3 as shown in FIGS. 1 and 2. The carrier 3 has a chassis 5 that is provided with tracks 7. A platform 9 is rotatably mounted on the chassis 5.

The delimber 1 also has a delimbing unit 11 adapted to be mounted onto the carrier 3. The delimber unit 11 has a main tubular frame 13 with a delimbing boom 15 slidably mounted through the frame 13. Means (not shown) are provided for moving the boom 15 back and forth through the frame 13. Tree gripping means 17 are provided on the frame 13 at its front end. Tree delimbing means 19 are provided on the boom 15 at its front end.

First support means 21 are provided for operatively connecting the delimbing unit 11 to the carrier 3. The first support means 21 comprises a rigid, fixed-length, first support member 23. First pivot means 25 connect the fixed-length, first support member 23 at one end 27 to a pivot mounting 29 on the front of the carrier platform 9. Second pivot means 31 connect the first support member 23 at its other end 33 to the bottom end 35 of a pair of mounting plates 37 extending down from about the center of the main frame 13 on the delimber unit 11.

Second support means 41 are provided for operatively connecting the delimbing unit 11 to the carrier 3, and for raising or lowering the delimbing unit 11 relative to the carrier 3. The second support means 41 comprises a pair of rigid, variable-length, second support members 43, one located on each side of the fixed-length, first support member 23. Each variable-length, second support member 43 comprises a fluid actuator having a cylindrical casing 45 housing a piston (not shown) with the piston rod 47 projecting from one end of the casing 45. Each second support member 43 is pivotally connected at one end 49 to a bracket 51 on the front of the carrier 3 with pivot means 53. The other end 55 of each second support member 43 is pivotally connected to a cross-brace 56 on the first support means 21, near its other end 33, with pivot means 57. A bracket 59 extends down from each side of the cross-brace 56. The other end 55 of each second support member 43 is connected to a bracket 59 with the pivot means 57.

Third support means 63 are provided for operatively connecting the delimbing unit 11 to the first support means 21, and for pivoting the delimbing unit 11 about its pivot connection 31 to the first support means 21. The third support means 63 comprises a pair of rigid, variable-length third support members 65, one located on each side of the first support member 23. Each variable-length third support member 65 comprises a fluid actuator having a cylindrical casing 67 housing a piston (not shown) with the piston rod 69 projecting from one end of the casing 67. Pivot means 71 connect one end 73 of each third support member 65 to a bracket 75 mounted on a second cross-brace 76 on the first support member 23 near its one end 27. Pivot means 77 connect the other end 79 of each third support member 65 to one of the mounting plates 37 extending down from the main frame 13 of delimber unit 11. The connection to the mounting plates 37 is made well above the pivot connection 31 of the first support member 23 to the plates 37.

The first, second and third support means 21, 41 and 63 respectively, together comprise a connector "C" for use in connecting the delimbing unit 11 to the carrier 3. The connector "C" can be provided with the second support means 41 already pivotally connected to the first support means 21 via pivot means 57 and with the third support means 63 already pivotally connected to the first support means 21 via pivot means 71. In the field, the connector "C" is connected to the carrier 3 via pivot means 25, 53 connecting the first and second support means 21, 41 respectively. The connector "C" is also connected to the delimbing units 11 via pivot means 31, 77 connecting the first and third support means 21, 63 respectively.

In use, the delimber 1 is employed with the delimbing unit 11 in a raised, working position above the carrier 3 as shown in FIG. 1. The delimbing unit 11 is maintained in the raised working position by extension of the second support members 43 which pivot the other end 33 of the first support member 23, carrying the delimbing unit 11, upwardly. In the raised working position, one end of a tree to be delimbed is gripped by the tree gripping means 1 with the delimbing means 19 located adjacent the tree gripping means 17. The boom 15 is then moved forwardly relative to the frame 13 to have the delimbing means 19 delimb the gripped tree. The delimbing unit 11 can be tilted in its working position by extension of the third support members 65 to tilt the front of the boom downwardly about pivot means 3 so that the delimbing means 19 can grasp a tree on the ground by its butt end and bring it to tree gripping means 17. Once the tree is gripped, the third support members are retracted to level the boom 15 for delimbing.

Figure 3:
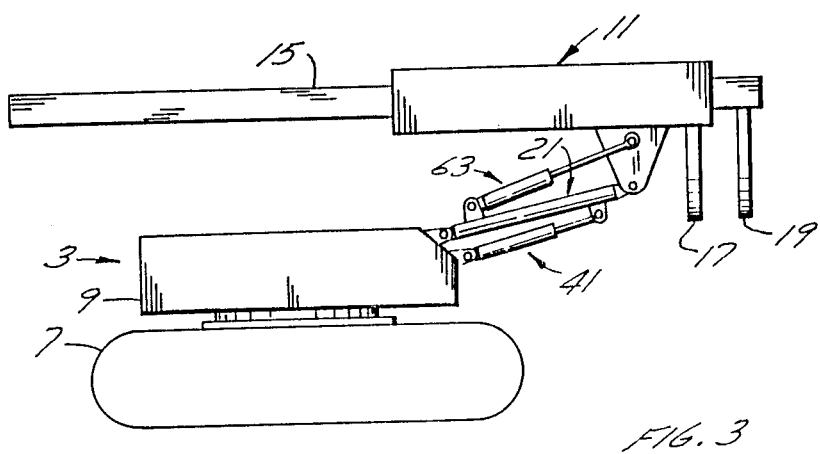
FIG. 3 is an elevation view of the delimber in its travel position.

When the delimber 1 is to travel some distance, the delimbing unit 11 can be moved to a lowered, travel position as shown in FIG. 3 by retracting the second support members 43. This lowers the first support member 23 about pivot means 25, and thus lowers the attached delimbing unit 11. The third support members 65 can be operated to level the delimbing unit 11 if needed after it has been lowered. With the delimbing unit 11 lowered, the delimber 1 can easily travel through the forest, and on highways where it can now pass under bridges.

The second support means 41 has been described as being pivotally connected to the first support means 21 via brackets 59. However the second support means 41 could also be directly connected to the mounting plates 37 on the delimbing unit 11. The third support means 63 has been described as being pivotally connected to the first support means 21. However it could also be directly connected to the carrier platform 9.

I claim:

1. A tree delimber having: a mobile carrier and a delimbing unit; the delimbing unit comprising a main tubular frame with a delimbing boom slidably mounted through the frame; first fixed-length support means pivotally connected at one end to the carrier and at the other end to the tubular frame; and second variable-length support means pivotally connected between the carrier and the first support means near its other end for helping to support the delimbing unit in a raised working position and to move the delimbing unit between the raised working position and a lowered travel position.

2. A tree delimber having: a mobile carrier and a delimbing unit; the delimbing unit comprising a main tubular frame with a deliming boom slidably mounted through the frame; first fixed-length support means pivotally connected at one end to the carrier and at the other end to the tubular frame; second variable-length support means pivotally connected between the carrier and the first support means near its other end for helping to support the delimbing unit in a raised working position and to move the delimbing unit between the raised working position and a lowered travel position; and third variable-length support means pivotally connected between the tubular frame and one of the first support means and the carrier to pivot the delimbing unit about its pivot connection to the first support means,

* * * * *